US008777177B2

(12) United States Patent
Youngers et al.

(10) Patent No.: US 8,777,177 B2
(45) Date of Patent: Jul. 15, 2014

(54) HYDRAULIC FLUID ACTUATED EQUIPMENT LEVELING ASSEMBLY

(76) Inventors: Stephen A. Youngers, Clearwater, KS (US); James J. Youngers, Viola, KS (US); Neil J. Youngers, Viola, KS (US)

( * ) Notice: Subject to any disclaimer, the term of this patent is extended or adjusted under 35 U.S.C. 154(b) by 348 days.

(21) Appl. No.: 13/278,447

(22) Filed: Oct. 21, 2011

(65) Prior Publication Data

US 2013/0098026 A1 Apr. 25, 2013

(51) Int. Cl.
*F16M 13/00* (2006.01)

(52) U.S. Cl.
USPC ............ 248/631; 248/188.2; 248/654; 92/18; 254/423

(58) Field of Classification Search
CPC .......... B60N 2/527; B60N 2/525; B60N 2/52; F15B 11/16; F15B 15/16; F15B 2211/30505; B66C 2700/062; B66C 23/80
USPC ........... 248/188.2, 618, 631, 354.1, 637, 638, 248/649, 651, 654; 52/167.4; 92/17, 18, 92/145; 137/596.12, 596.13; 267/113, 267/118; 254/423, 93 H
See application file for complete search history.

(56) References Cited

U.S. PATENT DOCUMENTS

| | | | |
|---|---|---|---|
| 2,510,285 A | 6/1950 | Heyerman | |
| 3,072,209 A * | 1/1963 | Perry, Jr. | 177/179 |
| 3,236,489 A * | 2/1966 | Mattocks et al. | 254/93 A |
| 3,321,182 A | 5/1967 | Elenburg | |
| 3,578,278 A | 5/1971 | Pickering | |
| 3,871,478 A | 3/1975 | Bushnell, Jr. | |
| 4,014,519 A * | 3/1977 | Leigh | 254/423 |
| 4,046,354 A | 9/1977 | Stith, Jr. | |
| 4,135,392 A | 1/1979 | Young | |
| 4,592,532 A | 6/1986 | Stith, Jr. | |
| 4,600,084 A | 7/1986 | Ray | |
| 4,846,436 A | 7/1989 | Young et al. | |
| 4,930,741 A | 6/1990 | Young et al. | |
| 5,065,844 A | 11/1991 | Hon | |
| 5,188,379 A | 2/1993 | Krause et al. | |
| 5,258,913 A | 11/1993 | Baldauf | |
| 5,577,703 A | 11/1996 | Young | |
| 5,797,227 A | 8/1998 | Garza-Tamez | |
| 6,299,137 B1 | 10/2001 | Bainter | |
| 6,895,648 B1 * | 5/2005 | Willett | 29/402.08 |
| 7,506,593 B2 | 3/2009 | Strabel, III | |
| 8,528,261 B2 * | 9/2013 | Whittaker et al. | 52/2.13 |
| 2001/0025951 A1 | 10/2001 | Bainter | |
| 2007/0098494 A1 | 5/2007 | Mares | |
| 2009/0321607 A1 | 12/2009 | Baron et al. | |
| 2010/0032534 A1 | 2/2010 | Cho | |
| 2011/0024706 A1 * | 2/2011 | Schwindaman et al. | 254/93 R |

FOREIGN PATENT DOCUMENTS

| | | |
|---|---|---|
| GB | 855633 | 12/1960 |
| JP | 2004203573 | 7/2004 |

* cited by examiner

*Primary Examiner* — Anita M King
(74) *Attorney, Agent, or Firm* — Kenneth H. Jack; Davis & Jack, L.L.C.

(57) ABSTRACT

A hydraulic fluid actuated equipment leveling assembly incorporating a plenum having adjustment ports; an input channel opening the plenum; a disk valve operable for opening and closing the adjustment ports; telescoping and hydraulic ram actuated equipment support pedestals; hydraulic lines spanning between the plenum's adjustment ports, and the pedestal's hydraulic rams; and fluid displacing plungers connected operatively to the hydraulic lines for adjusting the hydraulic line's interior volumes.

15 Claims, 5 Drawing Sheets

HYDRAULIC FLUID ACTUATED EQUIPMENT LEVELING ASSEMBLY

FIELD OF THE INVENTION

This invention relates to precision equipment, and auxiliary equipment adapted for leveling of precision equipment upon floor surfaces. More particularly, this invention is related to telescoping foot or pedestal systems which are adapted for equipment supporting and equipment leveling.

BACKGROUND OF THE INVENTION

In commonly known jack screw actuated or hydraulic ram actuated equipment leveling systems, a plurality of vertically telescoping feet or pedestals are provided for supporting and leveling the equipment. Such telescoping pedestals are typically operated independently from each other, undesirably complicating the task of utilizing the system for leveling the supported equipment.

In an example of such difficulties, an operator of such commonly known equipment leveling system may find that a corner of an item of precision equipment to be leveled (such as a multi-axis milling machine) is excessively low. In the event that a jack screw actuated telescoping pedestal is provided at that low corner, the operator may operate such pedestal's jack screw to raise the equipment's low corner. In doing so, the operator often undesirably lifts the equipment's support chassis away from other support pedestals, or undesirably skews the chassis by altering supporting pressures at the other pedestals. Accordingly, individual and independent operation and actuation of one telescoping pedestal often undesirably requires adjustment and readjustment of other telescoping support pedestals. Also, in such common system, the gross elevation of the equipment item is often desirably changed. In such common system, it is often difficult and time consuming to sequentially operate each of the system's pedestals to alter the equipment's gross elevation while preserving an earlier established orientation with respect to the horizontal plane. Adjustment of the gross elevation of the equipment often must be followed by further reorienting readjustments.

The instant invention solves or ameliorates problems discussed above by providing a hydraulic fluid actuated equipment leveling assembly which cross communicates hydraulic fluid pressure and flow between hydraulic ram actuated telescoping pedestals, such communication eliminating the need for individually manually operating each pedestal. The instant inventive assembly further provides for centralized micro-adjustments of individual telescoping pedestals following a fluid cross communicating pedestal operating step. The instant inventive assembly further provides for precision simultaneous raising and lowering of pedestals among the assembly for adjusting the gross elevation of supported equipment while preserving a previously established micro-adjusted orientation of the equipment in relation to the horizontal plane.

BRIEF SUMMARY OF THE INVENTION

A preferred structural component of the instant inventive hydraulic fluid actuated equipment leveling assembly comprises a housing which forms and defines a hollow interior space or void. A hydraulic fluid distributing plenum is preferably provided, and such space or void within such housing preferably functions as the hydraulic fluid distributing plenum. In the preferred embodiment, the housing is cylindrical, having a circumferential wall, and having a lower wall or floor.

Hydraulic fluid input means are preferably provided for injecting pressurized hydraulic fluid into the plenum, the input means preferably comprising a port which opens at the plenum. A hydraulic line preferably extends outwardly from such port, the inner or plenum end of such hydraulic line preferably being configured as a channel extending through the housing wall. The outward extension of such line preferably comprise a common high pressure hydraulic hose. A high pressure hydraulic fluid pump is preferably attached to the outer or opposite end of such hose for supplying high pressure hydraulic fluid to the assembly. The plenum or interior void of the instant inventive assembly is preferably opened by a plurality of adjustment ports, each adjustment port having a hydraulic line or adjustment channel extending outwardly therefrom.

A further structural component of the instant inventive assembly comprises valve means which are connected operatively to the housing for function in relation to the void or plenum, the value means preferably being adapted for alternatively permitting and resisting flows of the hydraulic fluid through each of the plenum's adjustment ports and channels. In a preferred embodiment, the value means comprises a movable disk or sealing element which is alternatively positionable to overlie, unseal, and open the adjustment ports and channels leading therefrom, and to be downwardly displaced for simultaneously covering, closing, and sealing each of the such ports. In a preferred embodiment, the valve means comprise a linear motion actuator which is operatively connected to the housing and to the plenum or void for reciprocatingly moving the preferred disk or sealing element, such actuator suitably comprising a manually turnable or motor turned jack screw. Other commonly known valve assemblies which are capable of simultaneously opening and closing multiple ports may be suitably substituted for such reciprocatingly movable disk or sealing element. Also, other commonly known linear motion actuators such as solenoid actuators, hydraulic actuators, or servo-motor actuators may be suitably alternatively used for driving and withdrawing the valve's sealing element.

Further structural components of the instant inventive hydraulic fluid actuated equipment leveling assembly comprise a plurality of telescoping and equipment supporting pedestals, each such pedestal preferably being hydraulic ram actuated for upward extension and downward retraction and for commensurate upward and downward equipment leveling. In the preferred embodiment, the base of each telescoping pedestal is configured as an upwardly opening cylinder, each such cylinder receiving a vertically slidably piston shaft whose upper end is configured for supporting impingement against an undersurface of supported equipment or machinery. Pressurized hydraulic fluid flow injected into such cylinder and about such shaft's lower end effectively raises and lowers the shaft and raises and lowers equipment supported by such shaft.

Further structural components of the instant inventive assembly comprise a plurality of hydraulic lines, each hydraulic line having a plenum end and a pedestal end. Each hydraulic line's inner plenum end preferably is attached in fluid communication in one of the plenum's adjustment ports or channels, and the opposite end of each hydraulic line is preferably attached in fluid communication with one of the hydraulically actuated pedestals.

Further structural components of the instant inventive assembly preferably comprise fluid displacing means or fluid volume adjusting means, such means preferably comprising adjustment voids or chambers which are preferably integrally incorporated within the fluid channels or hydraulic lines which extend from the plenum. In the preferred embodiment, the fluid displacing means comprise a plurality of cylinders which are arranged radially about the plenum, each cylinder being served by a mechanical volume adjusting and fluid displacing element. In the preferred embodiment, the fluid volume adjusting means comprise a plurality of plungers which are situated and adapted for being alternatively mechanically driven into or withdrawn from the volume adjusting cylinders.

In operation of the instant inventive hydraulic fluid actuated equipment leveling assembly, an item of equipment or machinery, such as the multi-axis milling center, may initially be placed upon a plurality of the hydraulic ram actuated pedestals, such pedestals initially having little or no hydraulic fluid or hydraulic fluid pressure. Thereafter, the valve means may be operated for opening each of the plenum's adjustment ports, and pressurized hydraulic fluid may be pumped into the plenum to flow outwardly therefrom along the plenum's channel and hydraulic line outlets. In operation, hydraulic pressure and flow continues to be distributed by the assembly to the pedestal until at least three corners of the equipment item are raised, leaving a low fourth corner, the low corner typically being at the corner of the equipment which resides within the heaviest quadrant among the four quadrants of the equipment's horizontal x,y orienting plane. Thereafter, auxiliary jacking means are preferably utilized for raising the low corner to an elevation which is roughly commensurate with the elevations of the other three corners. Upon such auxiliary raising of such low fourth corner, hydraulic fluid advantageously flows between and is exchanged among the telescoping pedestals and hydraulic lines of the assembly, such flow passing through and being exchanged at the assembly's opened plenum. Thereafter, upon such rough leveling of the equipment, the valve means may be operated to close and seal each of the plenum's adjustment ports and channels. Such valve closure advantageously hydraulically isolates each telescoping pedestal, along with its hydraulic line.

Thereafter, the assembly's fluid displacing and volume adjusting means may be operated for making small individual and independent adjustments to the fluid volumes represented by each hydraulically actuated pedestal and associated hydraulic line. Such volume varying adjustments vertically move the pedestals' shafts for precise equipment leveling.

In a preferred embodiment, the fluid displacing and volume adjusting means comprise cylinder and plunger combinations, each such combination preferably residing within the housing. Where reciprocating motion of such plungers is jack screw actuated, manual turning of the jack screws advantageously extends and retracts the plungers into the isolated fluid volumes for effecting minute calibrated changes in hydraulic fluid volume and for effecting minute adjustments of telescoping pedestal levels.

The floor of each fluid volume adjusting cylinder preferably comprises an upper face of a piston which is slidably mounted within the cylinder. Means for simultaneously upwardly driving and downwardly drawing each of such cylinders are preferably provided. Such means advantageously facilitates simultaneous and identical variations in each of the isolated fluid volumes, and allows for gross raising and lowering of a supported equipment item without disturbing a previously established orientation of the equipment in relation to the horizontal plane.

The instant inventive hydraulic fluid actuated equipment leveling assembly is typically intended for leveling of equipment in the nature of multi-axis milling centers. However, the assembly is broadly applicable to leveling of all other types of equipment, such as engines or turbines, which may need precision leveling. Additionally, equipment in the nature of a workpiece or part which is to undergo milling within a multi-axis milling center may itself be leveled through use and operation of the inventive assembly within a milling center.

Accordingly, objects of the instant invention include providing a hydraulic fluid actuated equipment leveling assembly which incorporates structures, as described above, and which arranges those structures in relation to each other in manners described above, for the performance of beneficial functions, as described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
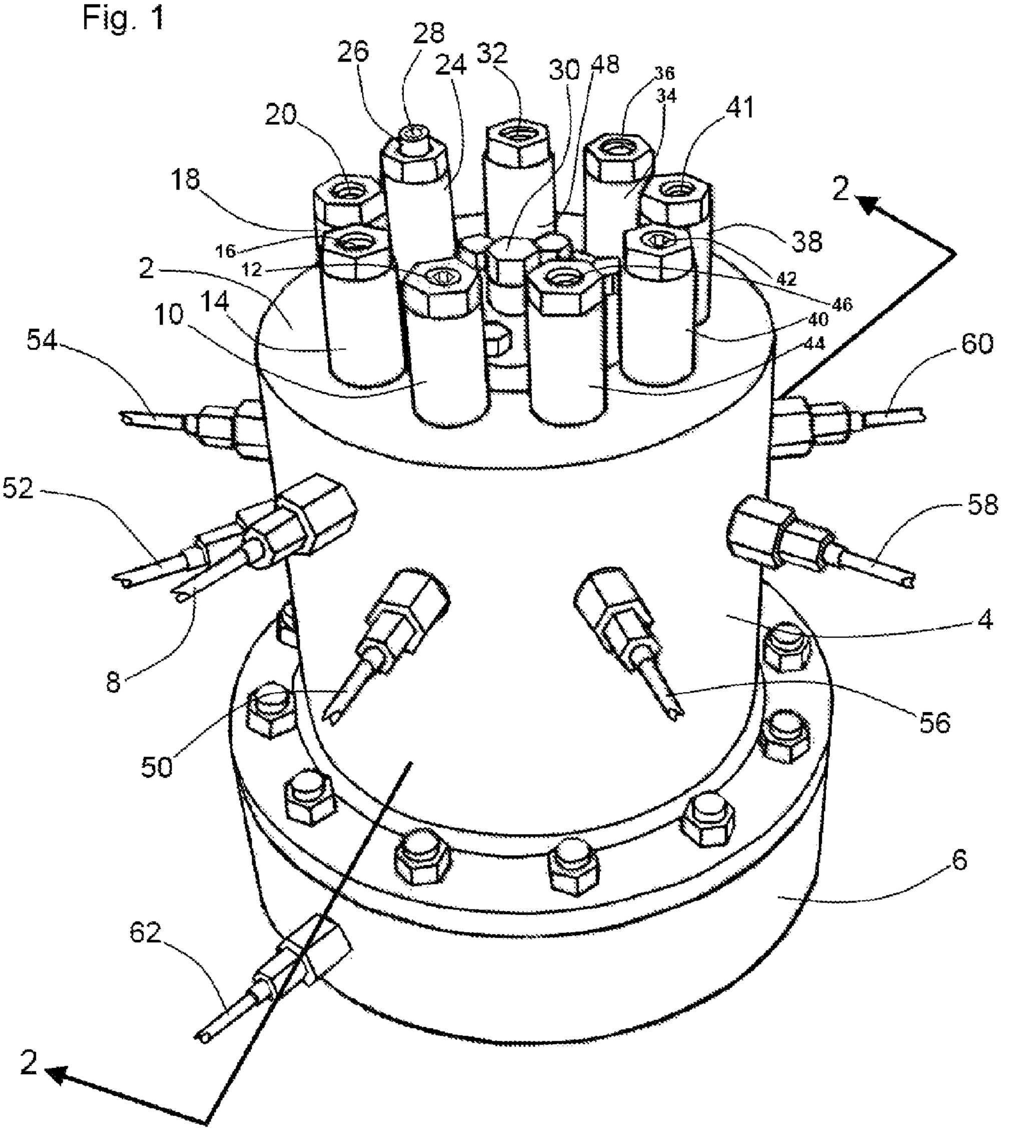
FIG. 1 is a perspective view of a central hydraulic fluid distributing and hydraulic fluid pressure and volume adjusting component of the instant inventive assembly.
Figure 2:
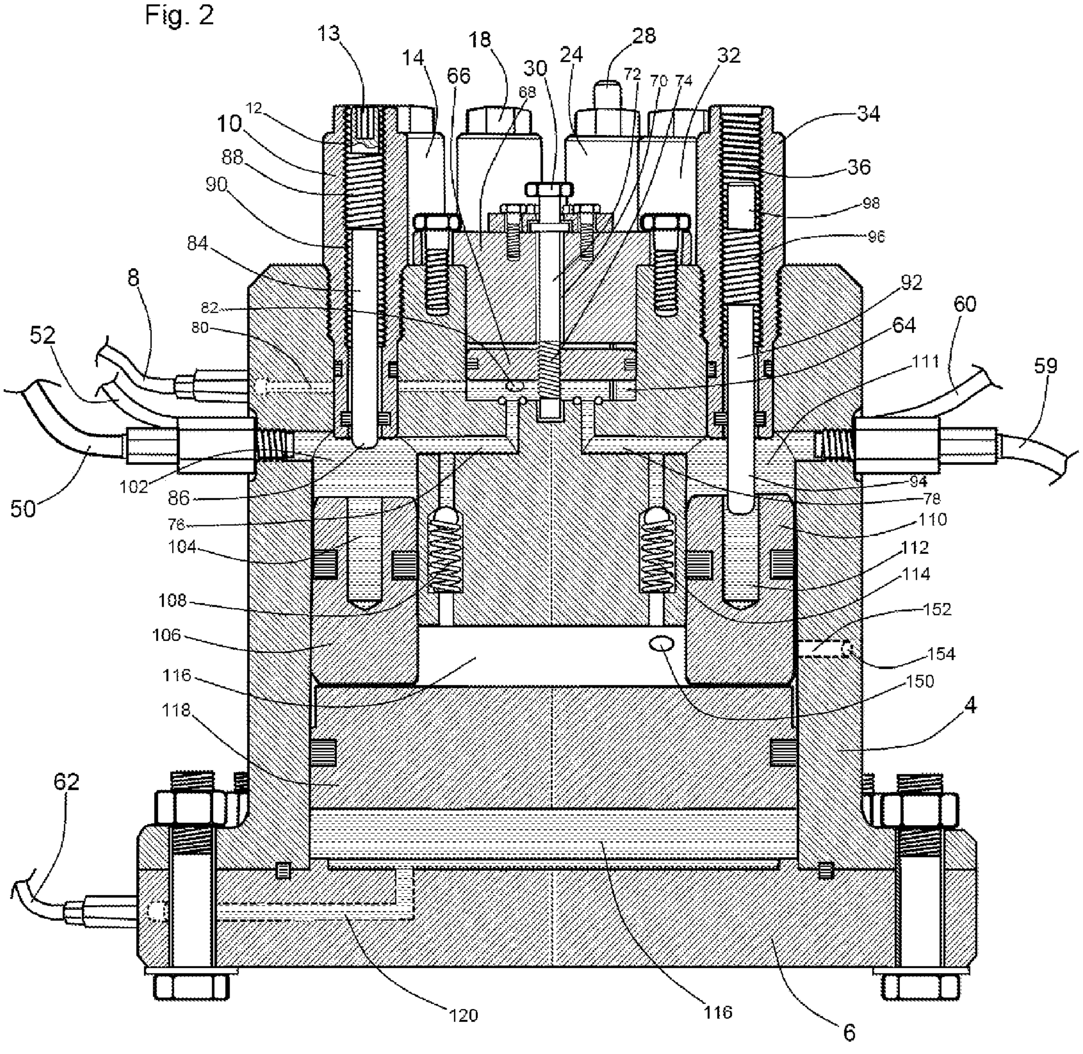
FIG. 2 is a sectional view as indicated in FIG. 1.
Figure 3:
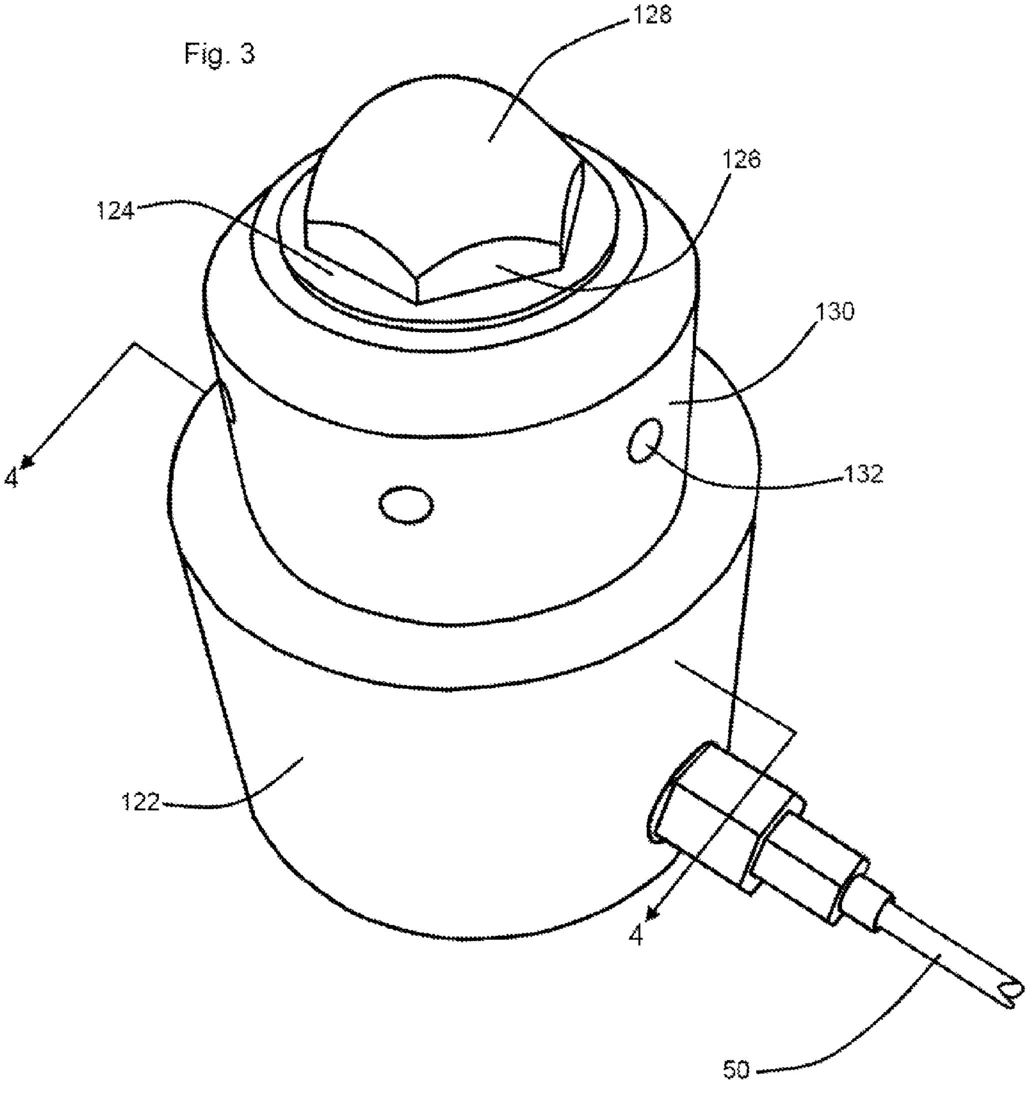
FIG. 3 is a perspective view of one of the hydraulic ram actuated telescoping pedestals of the instant inventive assembly.

Referring now to the drawings, and in particular to Drawing FIGS. 1 and 2, the instant inventive assembly comprises a plenum 64 which forms and defines a preferably cylindrical void for receiving pressurized hydraulic fluid (represented by dashed line fill). A housing 2 having a preferably cylindrical wall 4 may be provided. The circumferential wall of the plenum or void 64 is preferably formed and defined by inner surfaces of the cylindrical wall 4. Fluid volume adjusting channels representing channels 76 and 78 are provided, such channels' interior plenum ends opening the plenum/void 64. Channels represented by channels 76 and 78 effectively comprise inner or plenum ends of hydraulic lines 50 and 59 along with, referring further to FIGS. 1 and 5, other assembly hydraulic lines 58, 52, 56, 54, and 60. Each such hydraulic line's inner plenum end or associated adjustment channel effects an opening for cross communicating hydraulic fluid flow within the plenum 64.

Referring to FIG. 2, valve means are preferably provided for alternatively closing and sealing or opening and unsealing each of the volume adjusting hydraulic fluid ports which open the plenum 64. In a preferred embodiment, the valve means comprise a slidably mounted disk or sealing element 66 which vertically moves within the cylindrical void of the plenum 64. A jack screw 72 which extends vertically through a jack screw receiving channel 70 within a plenum cap or ceiling 68 vertically actuates disk 66 through engagement of helical threads 74 and through wrench turning of hexagonal head 30. Clockwise turning of such jack screw assembly advantageously drives the sealing disk 66 downwardly to cover each of the adjustment ports of the plenum 64 including the inner plenum ends of hydraulic channels 76 and 78. Counter-clockwise turning of such jack screw assembly alternatively raises the sealing disk 66 for opening the plenum's adjustment ports, advantageously allowing for pressure equalizing and equipment leveling cross flows of hydraulic fluids between all of the attached hydraulic lines. The valve means depicted in FIG. 2 is representative of other commonly known valve assemblies which are capable of simultaneously controlling fluid flow into and out of a plurality of ports or openings. For example, the gate of a gate valve may cover multiple ports or the ball of a ball valve may similarly cover multiple ports. Disk valve 66 is preferred since it may effectively simultaneously close multiple ports.

Referring further to FIG. 2, the two hydraulic lines 50 and 59 which reside within the sectioned planes, along with each of the seven other hydraulic lines not within the sectioned planes, are considered to comprise the inner or plenum end channels 76 and 78 which terminate at ports which open the plenum 64. Each of the plenum end channels represented by channels 76 and 78 is preferably specially configured to incorporate or include an enlarged chamber or bore expansion represented by chamber 102 and chamber 111. Each of the other seven channels/hydraulic line plenum ends not within the sectional planes preferably similarly include such a chamber or bore expansion. Such bore expansions are provided within the housing 4 for purposes of fluid volume adjustments, and mechanical fluid displacing means for precise pedestal level adjustments are preferably associated with each such bore expansion.

In a preferred embodiment, the fluid displacing and pedestal level adjusting means comprise a plurality of plungers, represented by plungers 84 and 92, whose lower ends 86 and 94 may be alternatively downwardly extended into or upwardly retracted from their underlying bore expansions. Jack screw actuators represented by jack screw housings 10 and 34, along with female and male helical threads 90 and 88, and 36 and 96, maybe provided to operate to drive and draw the plungers 84 and 92 downwardly and upwardly with respect to the fluid filled chamber spaces 102 and 111. The upper heads 12 and 98 of such jack screw assemblies preferably present allen wrench receiving sockets 13 for facilitating manual turning actuation of the plungers' jack screws. Referring further simultaneously to FIG. 1, jack screw housings 14, 18, 24, 48, 38, 40, and 44, along with their female helical threads 16, 20, 32, 41, and 46, and their associated jack screw shaft heads further represented by head 26, and allen wrench sockets further represented by sockets 28,42 are preferably configured similarly with and function similarly with the radially corresponding sectioned assemblies depicted in FIG. 2.

Referring to FIGS. 1 and 2, the hexagonal sockets 12, 28, and 42 represent allen wrench turning as a suitable means for actuating the fluid volume displacing plungers 84 and 92. Suitably, such plungers may be alternatively actuated through installation and operation of rotation controlled servo-motors (not depicted within views) such motors extending and retracting the plungers 84 and 92 through the operation of jack screws 88,90 and 96,36, in a manner similar to the allen wrench operation.

Referring simultaneously to FIGS. 1 and 2, means for injecting pressurized hydraulic fluid into the plenum void 64 are necessarily provided, such means preferably comprising an input hydraulic line 8 which communicates with or includes a channel 80 which extends through housing wall 4, such hydraulic line opening the plenum 64 at input port 82.

Referring to all figures, in operation of the assembly, jack screw 72 may be initially turned counter-clockwise to raise the valve means disk 66 and to open or unseal the fluid volume adjusting ports situated at the inner or plenum ends of the nine channels represented by channels 76 and 78. Thereafter, pressurized hydraulic fluid supplied by a hydraulic pump (not depicted within views) to hydraulic line 8 may pass through channel 80 and into plenum 64 to emit into the nine channels represented by sectioned channels 76 and 78. Thereafter, the hydraulic fluid passes through associated expansion bores or chambers represented by chambers 102 and 111. Thereafter, referring further to FIG. 5, telescoping pedestal hydraulic cylinders 122, 123, 125, 127, 129, 131, 133, 135 and 137 are actuated by the hydraulic fluid pressure and flow. Each of such pedestals' hydraulic cylinders is preferably configured identically with cylinder 122 which is shown in sectional view in FIG. 4.

Figure 4:
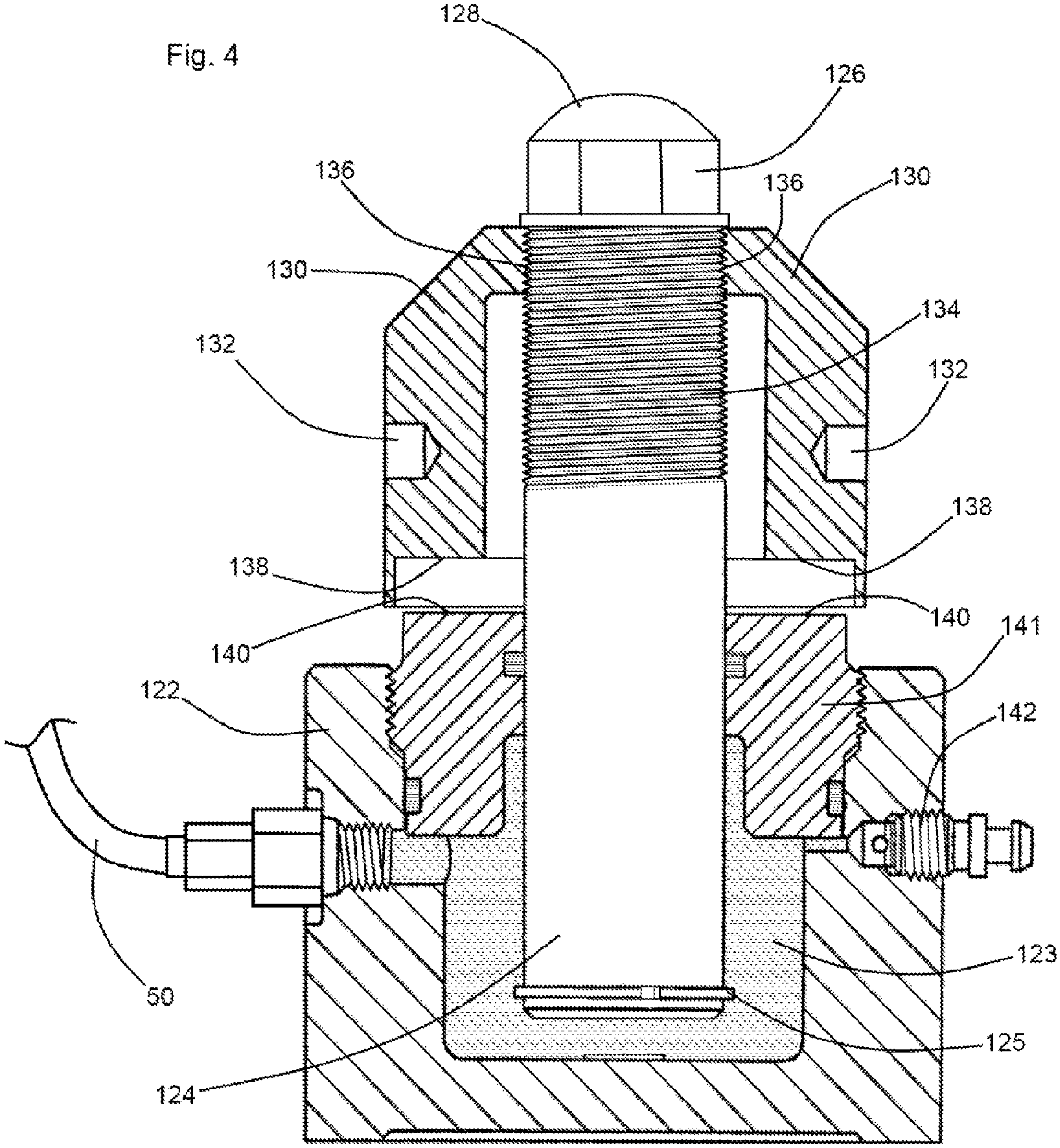
FIG. 4 is a sectional view as indicated in FIG. 3.

As indicated in FIG. 4, cylinder 122 vertically slidably receives a piston shaft 124 which is sealingly and slidably supported by cylinder gland 141. Hydraulic fluid pressure and flow emitting from hydraulic line 50 fills the cylinder annulus 123 and effectively upwardly drives the piston shaft 124. An extension stop 125 is preferably provided for preventing over extension of the piston shaft 124. According to the operation of the assembly of FIG. 4, the upper end 128 of the piston shaft 124 is rounded for impingement against a support point of, referring further to FIG. 5, an item of equipment 200 shown in dashed lines. A position locking nut 130 is preferably provided, such nut 130 having female helical threads 136 which threadedly engage male helical threads 134. Upon extension or retraction of piston shaft 124 to a desired elevation, an operator may turn the position locking nut 130 until its lower bearing surface 138 abuts the cylinder head's upper bearing surface 140, such abutting contact effectively locking the piston shaft 124 at the selected hydraulically adjusted vertical position. In the preferred embodiment, wrench engaging lands 126 and sockets 132 are provided so that relative counter torque can be provided to the nut 130 and to the piston shaft 124, allowing the nut 130 to alternatively function as an equipment level adjusting jack screw. A bleeder valve 142 is preferably provided for venting air from annulus 123.

Figure 5:
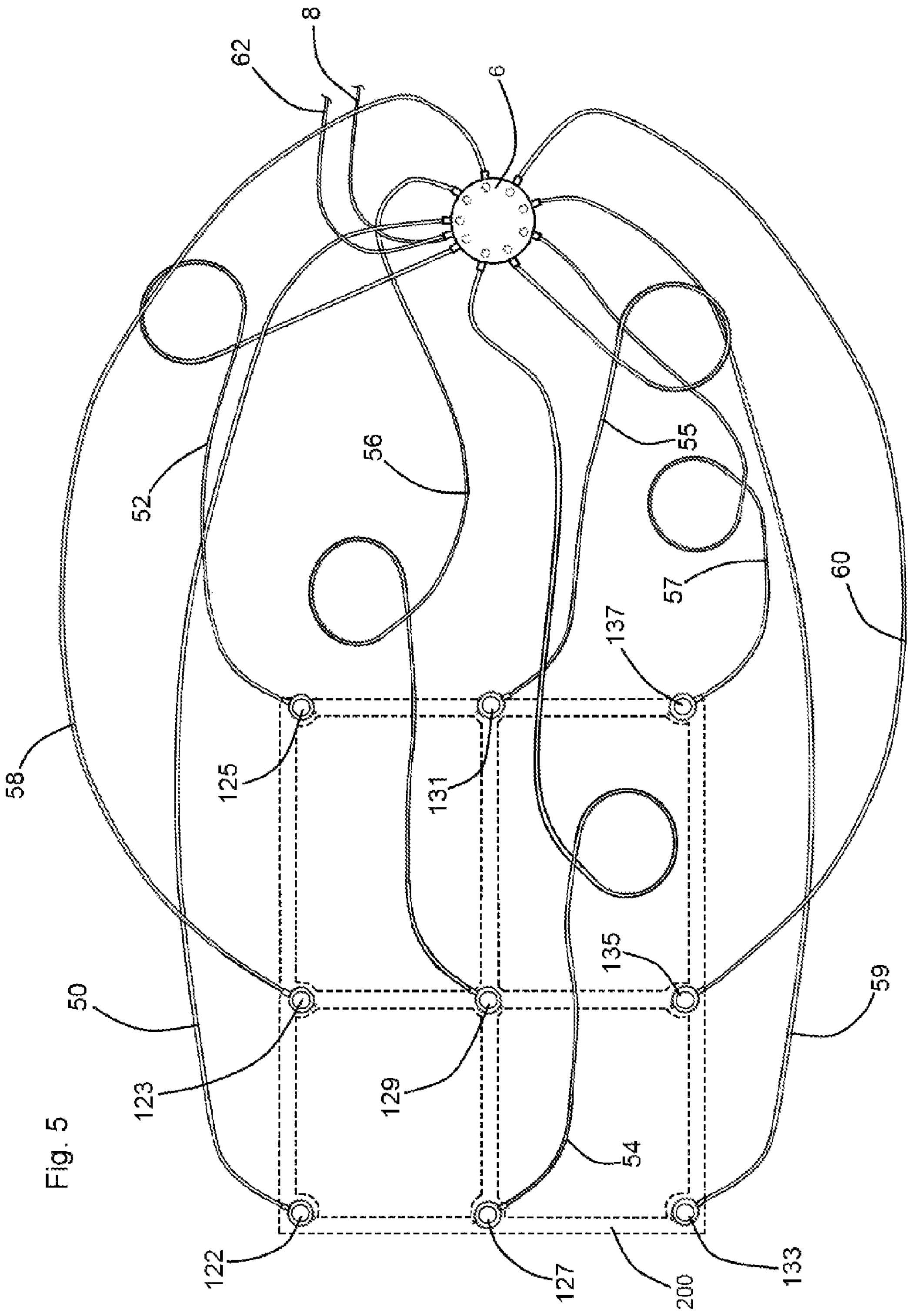
FIG. 5 is an undersurface view of the instant inventive assembly, the view showing the assembly supporting an item of equipment to be leveled, such equipment item being designated in dashed lines.

Referring simultaneously to FIGS. 1, 4, and 5, gross or rough equipment leveling may be initially performed with valve disk 66 at its raised position, hydraulic fluid cross flowing within the plenum 64 during such leveling. Thereafter, the jack screw actuated valve means 30,72,66 may be operated to close and seal the plenum ends of the nine channels represented by channels 76,78. Upon such closure, fluid volumes within the channels' bore extensions and within the hydraulic lines extending to the pedestal supports become hermetically isolated or segregated. Upon such valve actuated fluid volume isolation, the operator may, for example, engage an allen wrench with socket 13, and the operator may turn the wrench clockwise causing helical threads 88 and 90 to downwardly drive the lower end 86 of plunger 84 into the hydraulic fluid captured within the bore expansion/cylindrical chamber 102. Upon such plunger extension, the effective interior volume of the bore of the hydraulic line 50 including bore expansion 102 and channel 76 is lessened, and the plunger extension thereby injects displaced hydraulic fluid from hydraulic line 50 into annulus 123 of cylinder 122. Such injection of fluid into annulus 123 effectively drives piston shaft 124 upwardly, advantageously adjusting the equipment supporting elevation of the pedestal.

Each of the nine pedestals represented in FIG. 5 may have its vertical equipment supporting level adjusted or "fine tuned" through a similar allen wrench engaging operation. Opposite turning of such allen wrench effectively lowers the pedestals' levels.

Referring to FIG. 2, each of the volume adjusting bore expansions represented by chambers 102 and 111 is preferably cylindrical so that their floors may be configured as vertically slidable pistons 106 and 110. While making precising plunger adjustments for individually varying the isolated hydraulic fluid volumes, as discussed above, such cylinder configured bore expansion floors 106 and 110 preferably remain at a fixed and identical elevations beneath their chambers. Referring further to FIG. 5, following operation of the assembly to adjust the orientation the equipment 200 within a horizontal plane, it may become desirable to raise or lower the equipment item 200 without disturbing the precising adjustments previously applied to the nine individual telescoping pedestals 122, 123, 125, 127, 129, 131, 133, 135, and 137. Accordingly, means for simultaneously vertically moving each of the nine pistons represented by nine pistons 106 and 110 are provided. Such means preferably comprise a common piston 118 and cylinder 116 combination. The lower end of common cylinder 116 is preferably hermetically covered and sealed by a lower wall or floor 6. Pressurized hydraulic fluid injected into or withdrawn from cylinder 116 via hydraulic line 62 and channel 120 may effectively and advantageously raise or lower piston 118 within cylinder 116, and may simultaneously raise or lower each of the nine pistons represented by pistons 106 and 110. Preferably, each of such pistons includes an upwardly opening plunger clearance well, such wells being represented by wells 104 and 112.

Actuation of the hydraulic ram represented by piston 118 and cylinder 116 may effectively simultaneously and identically alter isolated hydraulic fluid volumes captured within the nine hydraulic lines and within the annuluses of the pedestals they serve, advantageously raising or lowering all of the pedestals in unison. Accordingly, the provision of the piston 118 and cylinder 116 combination above the floor 6 and underlying the cylinders 106 and 110 allows equipment such as equipment item 200 to be raised and lowered small distances without disturbing the precise leveling with the horizontal plane which may have been previously accomplished through the isolated hydraulic volume adjusting functions described above.

Referring simultaneously to FIGS. 2, 4, and 5, during operation of the common piston 118 and cylinder 116 for simultaneous hydraulic fluid pressure actuation of pedestals 122, 123, 125, 127, 129, 131, 133, 135, and 137, a stop ring such as ring 125 at the lower end of pedestal shaft 124 may accidentally impinge upwardly against gland 141. Upon such impingement, a relatively rigid and incompressible mechanical linkage is undesirably established between piston 106 and the gland 141 via the hydraulic fluid captured between those structures. Such relatively rigid linkage undesirably tends to divert hydraulic fluid pressure away from the other eight pedestals, whose shafts remain free to upwardly extend, to pedestal 122 and its line 50, undesirably dramatically increasing hydraulic fluid pressure within line 50. Accordingly, pressure relief channels controlled by pressure valves, represented by pressure valves 108 and 114, are preferably provided, such channels and valves allowing such excess hydraulic pressure and flow to emit into cylinder 116 through port 150, such excess fluid and pressure then outwardly flowing through channel 152 to protectively emit at an outlet port 154.

Referring simultaneously to all figures, it may be observed that the hydraulic fluid within channels represented by channel 76 and 78, within the cylindrical bore expansions represented by cylinders 102 and 111, within the hollow bores of hydraulic lines 50, 58, 52, 56, 54, 55, 57, 60, and 59, and within the annuluses of the nine hydraulically actuated pedestals 122, 123, 125, 127, 129, 131, 133, 135, and 137 constitutes an elastic weight bearing member within the assembly. Upon segregation and isolation of the hydraulic fluid into nine discreet volumes through closing actuation of the assembly's valve means 30,72,66, it becomes desirable that each segregated volume of hydraulic fluid have an effective "spring constant" which is substantially identical to that of each other segregated volume. Accordingly, those segregated volumes are preferably equalized, and the extensions and retractions of the volume adjusting plungers 84 and 92 are preferably the only elements which may relatively vary fluid volumes within the isolated zones. Accordingly, in order to equalize such segregated fluid volumes, the structures which form and define the segregated fluid volumes are preferably identically configured. The nine hydraulic lines preferably have identical lengths and bore dimensions, and the hydraulically actuated pedestals are preferably identically configured. Also, the circular and the radial symmetry of the hydraulic fluid distributing hub, as depicted in FIGS. 1 and 2, advantageously allows the channels extending from the preferably centrally positioned plenum 64 to have identical lengths. Where the segregated fluid volumes extending to and serving the hydraulically actuated pedestals are substantially identical, the pedestal raising or lowering responses to similar rotations of the plungers' jack screws are advantageously substantially identical. For example, where down stream fluid volumes are identical, a half turn to any of the assembly's nine plungers raises or lowers the corresponding pedestal an identical amount.

Referring to FIG. 5, the item of equipment 200 is represented as having nine support points at the undersurface of its chassis. In practice, items of equipment to be supported and leveled by the instant inventive assembly may have a lesser or greater number of support points, and may call for a lesser or greater number of hydraulically actuated telescoping pedestals. In order to accommodate such variability in equipment under support, the instant inventive assembly may be configured to include a fewer or greater number of telescoping pedestals, and the hydraulic fluid distributing and controlling components depicted in FIGS. 1 and 2 being correspondingly radially multiplied or radially lessened.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

We claim:

1. A hydraulic fluid actuated equipment leveling assembly comprising:

(a) a plenum having a plurality of adjustment ports;

(b) input means connected operatively to the plenum, said means being adapted for injecting the hydraulic fluid into the plenum, said means comprising an input port and hydraulic line combination, said combination's input port opening the plenum;

(c) valve means connected operatively to the plenum, the valve means being adapted for alternatively permitting and resisting flows of the hydraulic fluid through each of the plenum's adjustment ports;

(d) a plurality of telescoping pedestals, each pedestal among the plurality of telescoping pedestals being hydraulic ram actuated;

(e) a plurality of hydraulic lines, each hydraulic line among the plurality of hydraulic lines having a plenum end and a pedestal end, said each hydraulic line's plenum end being in fluid communication with said each plenum adjustment port, and said each hydraulic line's pedestal end being in fluid communication with said each pedestal's hydraulic ram; and (f) fluid displacing means connected operatively to the hydraulic lines, the fluid displacing means being adapted for, upon operation of the valve means to resist the flows of the hydraulic fluid through said each plenum adjustment port, alternately drawing the hydraulic fluid out of said each pedestal's hydraulic ram and driving the hydraulic fluid into said each pedestal's hydraulic ram; wherein the valve means comprise a plate and plate moving means, the plate overlying the plenum's adjustment ports and plate moving means being connected operatively to the plate, the plate moving means further being adapted for moving the plate between raised and lowered positions, the resisting flows of the hydraulic fluid through each plenum adjustment ports occurring upon moving the plate to the lowered position, and the permitting flows of the hydraulic fluid through each plenum adjustment port occurring upon moving the plate to the raised position.

2. The hydraulic fluid actuated equipment leveling assembly of claim 1 wherein the input means comprise an input port and hydraulic line combination, said combination's input port further opening the plenum.

3. The hydraulic fluid actuated equipment leveling assembly of claim 1 wherein the fluid displacing means comprise a plurality of bore expansions, each hydraulic line comprising one of the bore expansions.

4. The hydraulic fluid actuated equipment leveling assembly of claim 3 wherein the fluid displacing means comprise a plurality of plungers, and further comprise extending and retracting means connected operatively to the plungers and being adapted for alternatively driving each plunger into one of the bore expansions and withdrawing said each plunger out of the one of the bore expansions.

5. The hydraulic fluid actuated equipment leveling assembly of claim 4 wherein the plenum has a wall, and wherein each hydraulic line's plenum end comprises a channel opening the plenum at the wall.

6. The hydraulic fluid actuated equipment leveling assembly of claim 1 wherein each hydraulic line has an interior volume, each hydraulic line's interior volume being substantially equal to each other hydraulic line's interior volume.

7. A hydraulic fluid actuated equipment leveling assembly comprising:

(a) a plenum having a wall and a plurality of adjustment ports;

(b) input means connected operatively to the plenum, said means being adapted for injecting the hydraulic fluid into the plenum;

(c) valve means connected operatively to the plenum, the valve means being adapted for alternatively permitting and resisting flows of the hydraulic fluid through each of the plenum's adjustment ports;

(d) a plurality of telescoping pedestals, each pedestal among the plurality of telescoping pedestals being hydraulic ram actuated;

(e) a plurality of hydraulic lines, each hydraulic line among the plurality of hydraulic lines having a plenum end and a pedestal end, said each hydraulic line's plenum end comprising a channel opening the plenum at the wall, said each hydraulic line's plenum end being in fluid communication with said each plenum adjustment port, and said each hydraulic line's pedestal end being in fluid communication with said each pedestal's hydraulic ram; and (f) fluid displacing means connected operatively to the hydraulic lines, the fluid displacing means being adapted for, upon operation of the valve means to resist the flows of the hydraulic fluid through said each plenum adjustment port, alternately drawing the hydraulic fluid out of said each pedestal's hydraulic ram and driving the hydraulic fluid into said each pedestal's hydraulic ram, the fluid displacing means comprising a plurality of bore expansions, each hydraulic line comprising one of the bore expansions, and a comprising plurality of plungers and extending and retracting means connected operatively to the plungers, the extending and retracting means being adapted for alternately driving each plunger into one of the bore expansions and withdrawing said each plunger out of the one of the bore expansions, each bore expansion being positioned within the plenum's wall.

8. The hydraulic fluid actuated equipment leveling assembly of claim 7 wherein the extending and retracting means comprise a plurality of jack screw actuators.

9. The hydraulic fluid actuated equipment leveling assembly of claim 7 wherein each bore expansion comprises a cylinder, and further comprising a plurality of pistons, each piston being slidably received within one of the cylinders.

10. The hydraulic fluid actuated equipment leveling assembly of claim 9 further comprising piston moving means connected operatively to the pistons for alternatively driving and drawing the pistons within the cylinders.

11. The hydraulic fluid actuated equipment leveling assembly of claim 10 wherein the piston moving means comprise a common piston and cylinder combination, said combination underlying the plurality of pistons.

12. The hydraulic fluid actuated equipment leveling assembly of claim 11 wherein the housing comprises a lower wall and wherein the common piston and cylinder combination is positioned over the lower wall.

13. A hydraulic fluid actuated equipment leveling assembly comprising:

(a) a cylindrical housing;

(b) a void substantially centrally positioned within the housing;

(c) a plurality of adjustment channels, each channel among the plurality of adjustment channels having a volume, opening the housing, and having an inner end opening the void, said each channel's volume being substantially equal to each other adjustment channel's volume;

(d) an input channel further opening the housing and having an inner end further opening the void;

(e) valve means connected operatively to the housing, the valve means being adapted for alternately permitting and resisting flows of the hydraulic fluid between the void and the adjustment channels, the valve means comprising a sealing element and a linear motion actuator connected operatively to the sealing element for alternatively sealing and unsealing the adjustment channels' inner ends;

(f) a plurality of adjustment chambers comprising cylinders, each channel among the plurality of adjustment channels comprising one of the adjustment chambers;

(g) level adjusting means connected operatively to the housing, the level adjusting means being adapted for alternately increasing and decreasing each adjustment chamber's volume;

(h) a plurality of telescoping pedestals, each telescoping pedestal being hydraulic ram actuated; and (i) a plurality of hydraulic lines, each hydraulic line being in fluid communications with one of the channels among the plurality of adjustment channels and one of the telescoping pedestals' hydraulic rams; wherein the level adjusting means comprise a plurality of jack screw actuated plungers, each plunger among the plurality of jack screw actuated plungers being connected operatively to the housing for alternate extension into and retraction from one of the adjustment chambers.

14. The hydraulic fluid actuated equipment leveling assembly of claim 13 wherein the linear motion actuator comprises a jack screw.

15. The hydraulic fluid actuated equipment leveling assembly of claim 13 wherein each hydraulic line has a length, the length of each hydraulic line being substantially equal to each other hydraulic line's length.

* * * * *